United States Patent
Hanson et al.

[15] 3,643,153
[45] Feb. 15, 1972

[54] TEMPERATURE STABILIZATION OF TRANSISTOR VOLTAGE REGULATORS

[72] Inventors: Charles G. Hanson; Glen E. Harland, Jr., both of Kokomo, Ind.

[73] Assignee: General Motors Corporation, Detroit, Mich.

[22] Filed: Sept. 24, 1968

[21] Appl. No.: 761,932

[52] U.S. Cl.................................322/33, 322/28, 323/22 T
[51] Int. Cl..........................................................H02p 9/30
[58] Field of Search...........................322/28, 33; 323/22 T

[56] References Cited

UNITED STATES PATENTS

| | | | |
|---|---|---|---|
| 3,026,469 | 3/1962 | Wilbur et al. | 323/22 T |
| 3,152,298 | 10/1964 | Byles | 322/33 X |
| 3,241,040 | 3/1966 | Domann | 322/28 X |
| 3,249,849 | 5/1966 | Lagasse et al. | 323/22 T |
| 3,273,049 | 9/1966 | Shano | 322/28 |
| 3,365,646 | 1/1968 | Brewster | 322/28 X |
| 3,467,854 | 9/1969 | Harland, Jr. et al. | 322/28 |

*Primary Examiner*—William M. Shoop, Jr.
*Attorney*—E. W. Christen and C. R. Meland

[57] ABSTRACT

A transistor voltage regulator for regulating the output voltage of a generator. The generator is preferably a diode-rectified alternating current generator which is utilized to supply the electrical loads of a motor vehicle. The voltage regulator is of the switching-type and includes driver and output transistors connected such that when the driver transistor is nonconductive the output transistor is conductive and vice versa. The output transistor is connected with the field of the generator to control the output voltage of the diode-rectified alternating current generator. A thermistor, having a negative temperature coefficient of resistance is positioned to sense the temperature of the voltage regulator and is connected across the base and emitter electrodes of the output transistor. This thermistor provides stable operation of the voltage regulator at high temperatures by reducing the base drive to the base-emitter circuit of the output transistor when the driver transistor is biased fully conductive to ensure a nonconductive condition for the output transistor. In the preferred embodiment the driver transistor comprises two NPN-transistors connected in a Darlington configuration with the collectors of the transistors connected to the base of the output transistor through a forward biased PN-junction semiconductor diode.

4 Claims, 3 Drawing Figures

INVENTORS
Charles G. Hanson &
BY Glen E. Harland, Jr.

C. R. Meland
ATTORNEY

TEMPERATURE STABILIZATION OF TRANSISTOR VOLTAGE REGULATORS

This invention relates to a transistor voltage regulator for regulating the output of a generator and more particularly to a switching type of transistor voltage regulator for regulating the output voltage of a diode-rectified alternating current generator which is utilized to supply the electrical loads on a motor vehicle.

It is known in the art of transistor voltage regulators to provide a voltage regulator that includes a driver transistor stage and an output transistor stage and an interconnection between the transistors such that when the driver transistor stage is biased conductive the output transistor stage is biased nonconductive and when the driver transistor stage is biased nonconductive the output transistor stage is biased conductive. In this type of regulating system the output transistor is connected in series with the field winding of the generator and this transistor is operated in the switching mode in order to reduce heating of the transistor. The driver transistor is connected with a voltage-sensing circuit which senses the output voltage of the generator and switches on and off in accordance with the voltage sensed.

The driver and output transistors in the switching system that has been described have been connected such that the collector-emitter circuit of the driver transistor is connected across the base-emitter circuit of the output transistor. With this type of circuit arrangement the base-emitter circuit of the output transistor is forward biased whenever the driver transistor is biased nonconductive and the output transistor is biased nonconductive when the driver transistor is conductive.

Even when the driver transistor is fully conductive between its collector and emitter electrodes there nevertheless is some saturation voltage (for example 1 volt) across the collector and emitter and this voltage which is applied to the base and emitter of the output transistor may be sufficient to bias the output transistor on when it should be biased off. In some transistor switching systems a PN-junction semiconductor diode has been connected between the driver and output transistors in such a manner that the saturation voltage of the driver transistor must overcome the forward break down voltage of the diode and the base-emitter circuit of the output transistor in order to bias the output transistor on. The use of the diode enhances the temperature stability of the regulating system and aids in ensuring a nonconductive condition of the output transistor when the driver transistor is fully conductive.

In transistor switching circuits where the base-emitter circuit of an output transistor and a forward biased PN-junction semiconductor diode are connected across the collector-emitter circuit of the driver transistor the break down voltage of the forward-biased diode and the PN junction formed by the base-emitter of the output transistor decreases with increase in temperature at a faster rate than the reduction in voltage across the collector-emitter circuit of the driver transistor with the result that at elevated temperatures the driver transistor may still forward bias the output transistor when the output transistor should be switched off.

In order to provide stable switching operation for the type of switching transistor voltage regulator that has been described it is proposed by this invention to connect a thermistor having a negative temperature coefficient of resistance across the base and emitter of the output transistor and in series with a PN junction semiconductor diode. The thermistor is positioned to sense the temperature of the voltage regulator and with this arrangement the thermistor has a low resistance during high-temperature operation of the voltage regulator and shunts base drive current away from the base electrode of the output transistor in order to aid in maintaining the output transistor nonconductive when the driver transistor is biased conductive. At low-temperature operation the resistance of the thermistor increases to therefore shunt less current away from the base of the output transistor and this is desirable to provide good base drive for the output transistor. This increase in resistance of the thermistor, at low-temperature operation of the voltage regulator, is desirable because under this condition of operation the voltage required to break down the forward-biased diode and the base-emitter diode of the output transistor increases while the gain of the output transistor decreases.

It accordingly is an object of this invention to provide a generator transistor voltage regulator of the switching type which exhibits stable operation over a widely varying temperature range and which exhibits stable operation in an ambient high-temperature range of at least 125° C.

Another object of this invention is to provide a switching transistor voltage regulator for a generator which includes a transistor driver stage and a transistor output stage and a system where the collector and emitter of the driver stage are connected directly across the base and emitter of the output transistor and further to an arrangement where a thermistor having a negative temperature coefficient of resistance senses the temperature of the voltage regulator and is connected across the base and emitter electrodes of the output transistor.

A further object of this invention is to provide a voltage regulator for a diode-rectified alternating current generator which is utilized to supply the electrical loads on a motor vehicle including the charging of a storage battery, the voltage regulator being of the transistor switching type, and including a thermistor that is positioned to respond to the temperature of the voltage regulator connected across the base and emitter of the output transistor for ensuring a cutoff condition of the output transistor during its switching mode of operation and during high-temperature operation of the voltage regulator.

Still another object of this invention is to provide a transistor voltage regulating system for regulating the output voltage of a generator where the voltage regulator includes transistor output and driver stages which are connected such that the base-emitter circuit of the output transistor is connected across the collector-emitter circuit of the driver transistor and further to an arrangement where a forward-biased semiconductor device connects the driver transistor to the base of the output transistor and where a thermistor, having a negative temperature coefficient of resistance is coupled across the base and emitter electrodes of the output transistor and in series with the semiconductor device. This semiconductor device may take the form of a PN-junction semiconductor diode or may take the form of the collector-emitter circuit of a transistor utilized for voltage protection in the system.

Figure 1:
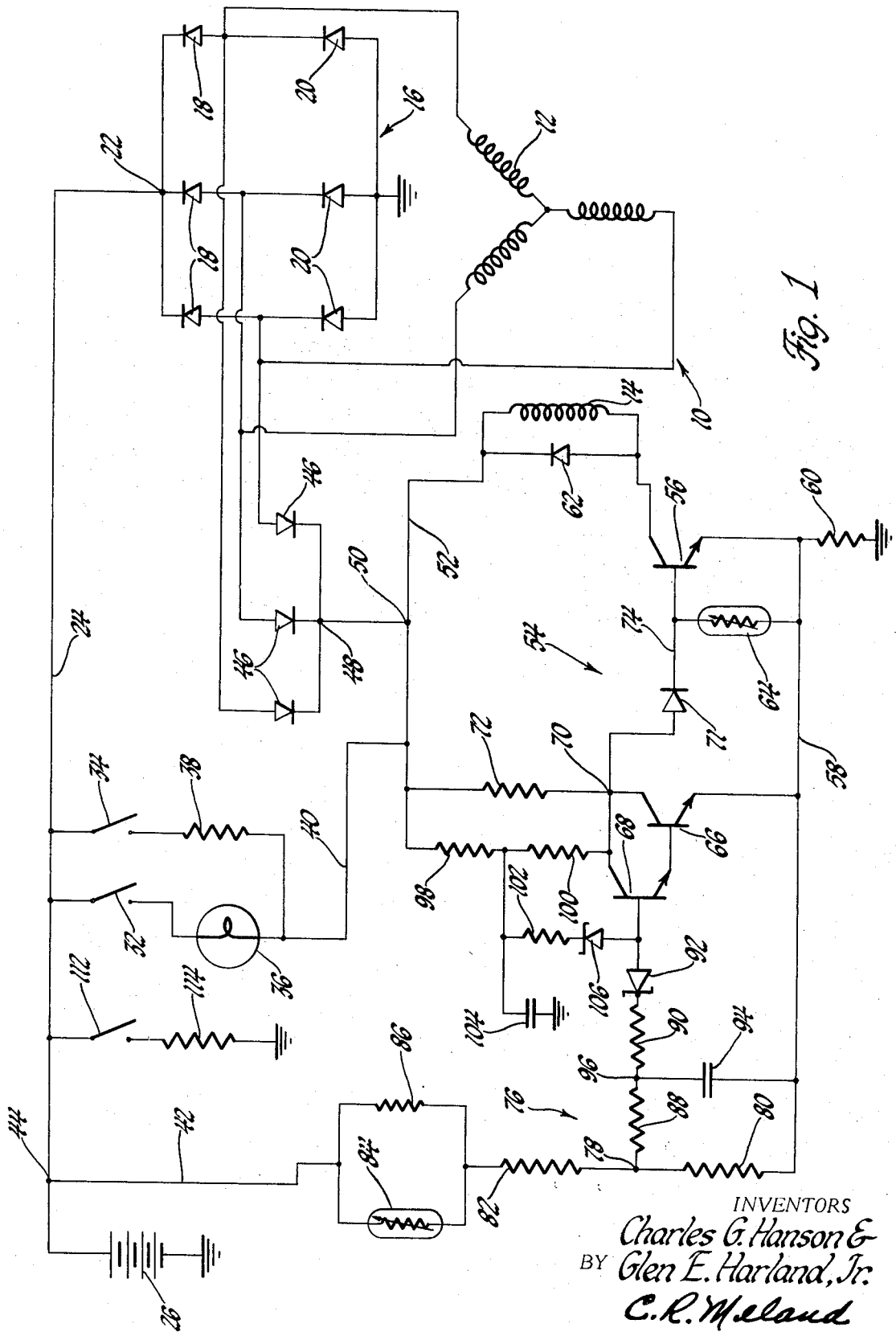
FIG. 1 is a schematic circuit diagram of a voltage-regulating system for a diode-rectified alternating current generator made in accordance with this invention.

Referring now to the drawings and more particularly to FIG. 1, reference numeral 10 designates an alternating current generator having a three phase Y-connected output winding 12 and a field winding 14. The output winding 12 is connected with the AC input terminals of a three phase full-wave bridge rectifier generally designated by reference numeral 16 and comprised of positive silicon diodes 18 and negative silicon diodes 20. The negative direct current output terminal of the bridge rectifier 16 is grounded whereas the positive direct current output terminal 22 of the bridge rectifier 16 is connected with a power supply conductor 24. The power supply conductor 24 is connected with the positive side of the battery 26 the opposite side of this battery being grounded. With the circuit that has thus far been described the battery 26 is directly connected across the direct current output terminals of the bridge rectifier 16 and when the generator is driven by an engine of a vehicle (not shown) the diode-rectified alternating current generator supplies charging current to the battery 26.

The cable conductor 24 is connected to one side of manually operable switches 32 and 34. The switch 32 is connected in series with a signal lamp 36 while the switch 34 is connected in series with a resistor 38. The signal lamp and resistor are connected in series with conductor 40 and when switches 32 and 34 are closed the field 14 of the generator will be initially energized from battery 26. The switch 34 can be the ignition switch on a motor vehicle whereas the switch 32 can be the accessory switch and this arrangement is provided to prevent feedback from the ignition system as is described in the U.S. Pat. to Donald C. Colvill, No. 3,244,900, issued on Apr. 5, 1966.

The conductor 24 is also connected with a voltage-sensing lead 42 at junction 44 and this voltage-sensing lead supplies a signal to the voltage regulator of the system which corresponds to the voltage appearing between junction 44 and ground.

The electrical system of this invention includes three auxiliary diodes 46 having their anodes connected respectively with the phase windings of the output winding 12. The cathodes of diodes 46 are connected to junction 48 and this junction is connected with junction 50 on conductor 52 of a transistor voltage regulator generally designated by reference numeral 54. The diodes 46, together with diodes 20 of bridge rectifier 16, form a three phase full-wave bridge rectifier having direct current output terminals 48 and ground. These terminals may be called direct current field-energizing terminals since this bridge rectifier supplies field current to field winding 14 when the generator is in operation. On the other hand when the generator is not operating there is no current supplied to the field winding 14 and the diodes 46 therefore operate as a static field disconnect device.

The transistor voltage regulator 54 of this invention includes an NPN power output transistor 56 having its emitter connected to conductor 58 and its collector connected to one side of field winding 14. A small resistor 60 of approximately 0.03 ohms is connected between conductor 58 and ground. The field winding 14 is connected to conductor 52 and a field discharge diode 62 is shunted across the field 14.

A thermistor 64 having a negative temperature coefficient of resistance is connected across the base and emitter electrodes of the power output transistor 56. The thermistor 64 has a negative temperature coefficient of resistance and preferably has a resistance of approximately 25 ohms at 140° C. and a resistance of approximately 15,000 ohms at −40° C. The resistance of the thermistor varies exponentially between these temperature limits. This thermistor may be formed by a thick film process disclosed and claimed in U.S. Pat. application Ser. No. 692,863, filed Dec. 22, 1967 now U.S. Pat. No. 3,477,055 and assigned to the assignee of this invention.

The transistor voltage regulator 54 has a driver stage comprised of NPN-transistors 66 and 68 connected in a Darlington amplifier configuration such that their collectors are connected to junction 70. A resistor 72 is connected between conductor 52 and junction 70 and the emitter of transistor 66 is connected to conductor 58.

A PN-junction semiconductor diode 71, which preferably is a silicon diode, has its anode connected to junction 70 and its cathode connected to conductor 74 which in turn is connected to the base of transistor 56 and one side of the thermistor 64.

The voltage regulator 54 includes a voltage divider generally designated by reference numeral 76 and having a junction 78. This voltage divider is connected between voltage-sensing lead 42 and conductor 58 and comprises resistor 80, resistor 82 and parallel connected thermistor 84 and resistor 86. The potential appearing between junction 78 and conductor 58 will be a function of the voltage between junction 44 and ground. The potential appearing at junction 78 is applied to the base-emitter junctions of transistors 68 and 66 through resistors 88 and 90 and a Zener diode 92. A capacitor 94 is connected between junction 96 and conductor 58. The voltage regulator further includes a voltage protection circuit comprised of resistors 98, 100 and 102, a capacitor 104 and another Zener diode 106. These components are connected as shown in FIG. 1 and the operation of this circuit will be described hereinafter.

The thermistor 64 must be physically positioned so that it responds to the ambient temperature of the environment in which the voltage regulator is operating. It is preferred to manufacture the voltage regulator by an integrated circuit technique and when this is done, as is more fully described hereinafter, the thermistor 64 and various semiconductor chips forming the components of the voltage regulator are mounted on a common ceramic substrate. When this type of physical construction is utilized the thermistor is carried by the ceramic substrate and applied thereto in a manner described in the above mentioned copending U.S. Pat. application Ser. No. 692,863 and now U.S. Pat. No. 3,477,055. With such an arrangement the thermistor will respond to the temperature of the substrate which will be indicative of the temperature of the voltage regulator.

If the voltage regulator were formed from discrete semiconductor components the thermistor should be placed in such a position that it will sense the ambient temperature surrounding the voltage regulator so that it can properly control the switching of the output transistor as temperature conditions of the voltage regulator change.

The operation of the electrical system shown in FIG. 1 will now be described. When the driver of a motor vehicle desires to start the engine of the vehicle the switches 32 and 34 are closed and the field of the generator 14 is now energized from battery 26, through conductor 24, through closed switches 32 and 34, through signal lamp 36 and resistor 38 to conductor 40, through conductor 52, through field winding 14 and then through the collector-emitter circuit of transistor 56 and the small resistor 60 to ground. At this time the transistor 56 is biased conductive since the voltage appearing between junction 78 and conductor 58 is not sufficient to forward bias the Darlington amplifier comprised of transistors 66 and 68 with the result that junction 70 has a relatively high potential.

With the field 14 initially energized from the battery 26 the generator develops an output voltage as the engine drives the generator and this voltage is rectified to provide charging current for battery 26 and to provide field-energizing current for the voltage regulator through diodes 46.

As the generator output voltage increases the potential between junction 78 of the voltage divider and conductor 58 rises. When this potential reaches a predetermined value which corresponds, for example, to a voltage of 14 volts at junction 44 in a 12-volt system, the Zener diode 92 and the base-emitter junctions of transistors 68 and 66 breakdown causing the transistor 66 to be biased conductive in its collector-emitter circuit. This breakdown occurs at what may be termed the desired regulated voltage for the electrical system which is to be maintained by the voltage regulator. When the Darlington amplifier (transistors 66 and 68) becomes biased conductive the resistor 72 is connected by the low-impedance path of the Darlington amplifier to conductor 58 with the result that the potential of junction 70 drops to a low value. It can be seen that the voltage appearing between junction 70 and conductor 58 is applied to a series circuit comprised of the PN-junction semiconductor diode 71 and the base-emitter diode of transistor 56.

The system is designed such that the collector-emitter voltage of transistor 66 is not sufficient to break down the forward-biased diode 71 and the base-emitter circuit of transistor 56 so that when transistor 66 is fully conductive the transistor 56 is biased nonconductive. As a result of this the field circuit for field winding 14 includes the high impedance of transistor 56 with the result that field current is reduced with a consequent reduction in output voltage of the generator 10.

When the output voltage of the generator decreases the voltage between junction 78 and conductor 58 decreases and a point is reached where the Darlington amplifier becomes biased nonconductive. When this happens the potential of junction 70 approaches the potential of conductor 52 with the result that the transistor 56 is immediately biased conductive providing a low-impedance path in series with the field winding 14.

It will be appreciated from the foregoing that transistor 56 switches on and off to maintain a desired field current which will provide a desired regulated output voltage for the diode-rectified alternating current generator.

During high temperature operation of the voltage regulator, for example in the range of 125° C., it is difficult without the use of the thermistor 64 to provide stable switching operation for the voltage regulator. Thus, as the ambient temperature of the environment in which the voltage regulator is operating increases the amount of voltage required to break down the forward-biased diode 71 and the base-emitter diode of transistor 56 decreases faster than the decreasing voltage across the collector-emitter circuit of transistor 66. This means that even when transistor 66 is in the saturated condition there may be sufficient voltage across transistor 66, during high-temperature operation, to forward bias transistor 56 with the result that the regulator will fail by not completely turning off transistor 56.

By using the thermistor 64, which has a negative temperature coefficient of resistance, it is possible to increase the temperature limit through which stable operation of the regulator is achieved. Thus, as the voltage regulator is subjected to higher temperatures the resistance of thermistor 64 decreases which shunts base current away from the base circuit of transistor 56. This aids in maintaining the transistor 56 nonconductive when it is desired that it be nonconductive and when the Darlington amplifier is fully conductive.

On the other hand when the voltage regulator is subjected to low temperatures the problem of turning off the output transistor 56 is alleviated since the amount of voltage required to break down the diode 71 and the base-emitter circuit of transistor 56 increases. In addition, it is desired at this time to have a high base drive current and this is now provided by the increase in resistance of thermistor 64 which now shunts less current away from the base of transistor 56.

The voltage protection circuit, which includes Zener diode 106, operates to protect the electrical system in the event that voltage-sensing lead 42 becomes disconnected from junction 44 or conductor 24 becomes disconnected from junction 22. In either case the voltage regulator will tend to turn the output transistor 56 on continuously since in each case the voltage regulator never sees a voltage sufficient to turn on transistor 66.

If this condition should occur the voltage applied to conductor 52 from auxiliary diodes 46 is also applied to Zener diode 106 and this diode will break down to forward bias transistors 68 and 66. The voltage regulator will now maintain a regulated voltage which is higher than the desired regulated voltage, for example, 19 to 25 volts in a 12-volt system.

Figure 2:
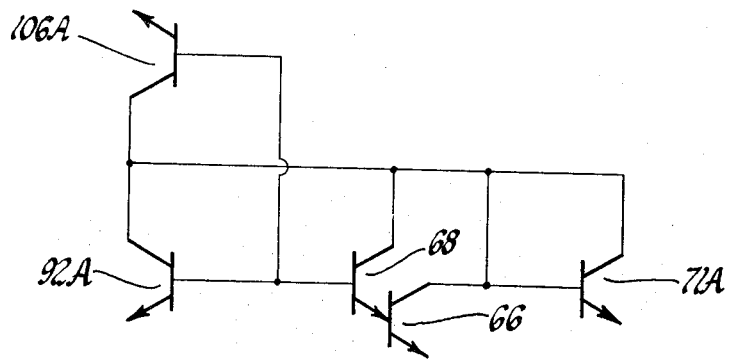
FIG. 2 is a schematic circuit diagram of a part of the voltage regulator illustrated in FIG. 1 and illustrating the electrical connections between various components where these components are formed as an integrated circuit on a single monolithic chip.

Referring now to FIG. 2, a schematic circuit diagram is illustrated where the driver stage of the voltage regulator 54 is formed as an integrated circuit from a single monolithic chip. As previously pointed out it is preferred that the voltage regulator be formed as an integrated circuit and this can be done by providing a common collector connection for a number of the components shown in FIG. 1. Thus, when forming the driver stage as an integrated circuit the Zener diode 106 is provided by the emitter-base junction of an NPN-transistor 106A. The Zener diode 92 is formed by the emitter-base junction of an NPN-transistor 92A. The Darlington amplifier is provided by transistors 66 and 68 and the diode 71 is provided by the base-emitter junction of NPN-transistor 71A. It will be appreciated from an inspection of FIG. 2 that the transistors illustrated all have a common collector connection and are used respectively as Zener diodes, a Darlington amplifier and a forward-biased diode.

Figure 3:
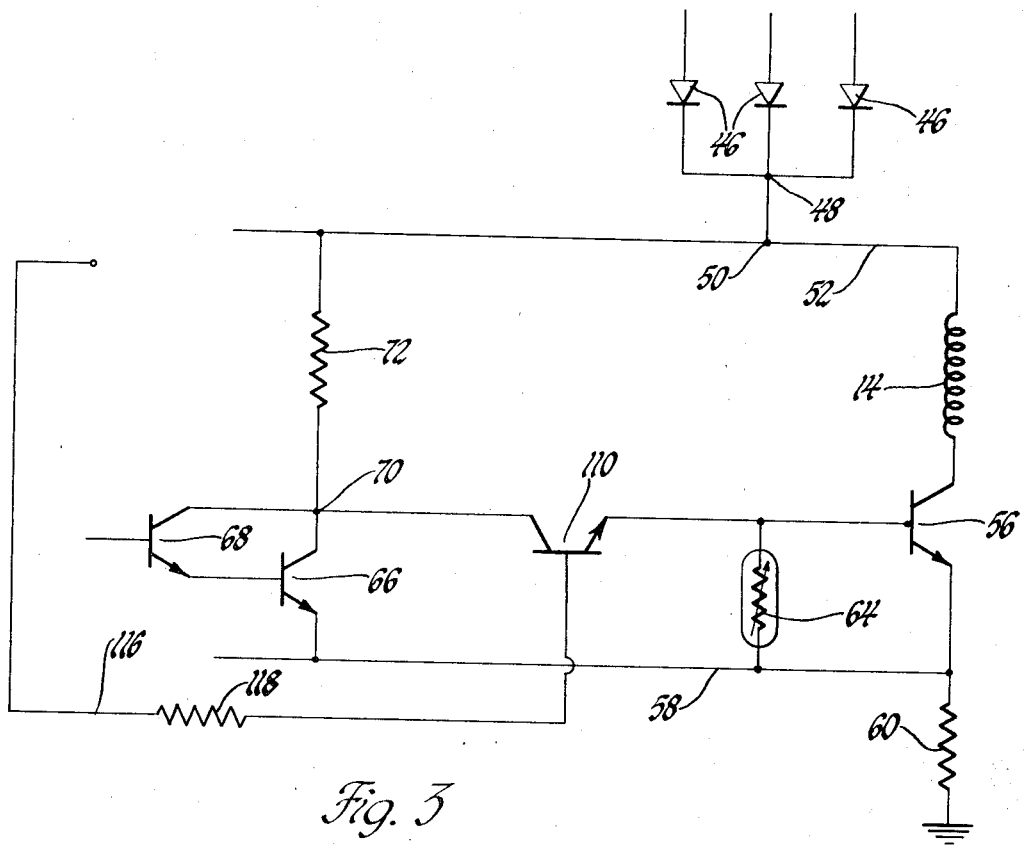
FIG. 3 is a circuit diagram illustrating a modification of the system shown in FIG. 1.

Referring now to FIG. 3, a modified circuit arrangement is illustrated which utilizes the thermistor 64 but which is adapted to provide additional voltage protection for the system of FIG. 1. FIG. 3 illustrates only a portion of FIG. 1 and is identical with FIG. 1 with the exception that an NPN-transistor 110 has replaced diode 71. The same reference numerals have been used in FIGS. 1 and 3 to identify the same components in each figure. In the FIG. 3 embodiment the transistor 110 connects or disconnects junction 70 and the base of transistor 56. The base of transistor 110 is connected with a lead 116 through resistor 118 and lead 116 is connected with conductor 42 in the system of FIG. 1 whenever the voltage protection transistor 110 is utilized.

The voltage protection transistor 110 provides additional protection for the electrical system where the conductor 42 becomes disconnected from junction 44. When this happens, as previously pointed out, the voltage can be regulated at a higher value by Zener diode 106 but since this higher voltage may cause overcharging of battery 26 and have other harmful effects on the electrical loads of the motor vehicle it is desired to reduce the output voltage on the generator to zero when the lead 42 becomes disconnected from junction 44. This is accomplished in FIG. 3 since the base and emitter electrodes of transistor 110 are forward biased by battery 26 when conductor 42 is connected to junction 44 but when conductor 42 and junction 44 are disconnected there is no forward bias on transistor 110 so that it assumes a nonconductive condition. This means that no base current can be supplied to transistor 56 with the result that it remains nonconductive to reduce the output voltage of the generator substantially to zero whenever lead 42 becomes inadvertently disconnected from junction 44.

The thermistor feature of this invention is useful in circuits of the type shown in FIG. 3 since it again will shunt base current away from the base of transistor 56 at high-temperature operation of the voltage regulator. It will be appreciated that the collector-emitter circuit of transistor 110 provides a voltage drop in a similar fashion to the voltage drop provided by diode 71 to reduce the likelihood of turning on transistor 56 when transistor 66 is fully conductive. In other words, the saturation voltage across the collector and emitter of transistor 66 which is applied to the base and emitter of transistor 56 is reduced by the amount of voltage drop across the collector-emitter circuit of transistor 110.

In practicing this invention, as previously pointed out, it is preferred that the voltage regulator be fabricated by an integrated circuit technique. Thus, the driver stage of the voltage regulator can be fabricated from a single monolithic chip as shown in FIG. 2 and the output transistor 56 can be fabricated as a separate chip. The driver chip and the output chip are supported on a ceramic substrate (not shown) which supports the thermistor 64.

The substrate can be placed in a suitable support and the entire voltage regulator mounted within the end frame of a diode-rectified alternating current generator which is utilized to supply the electrical loads on a motor vehicle.

In describing temperature ranges it will of course be appreciated that where the voltage regulator is mounted within a generator it will be subjected to heat dissipated by electrical components of the generator.

It is also pointed out that where the voltage regulator is operating within an environment which has an ambient temperature of 125° C. the substrate itself may have a temperature of 140° C. due to heat transfer from the transistors of the voltage regulator to the substrate. The thermistor, in the preferred embodiment as pointed out, is carried by the substrate and therefore may be subjected to temperatures as high as 140° C. when the ambient temperature of the environment in which the voltage regulator is operating is 125° C.

The switching circuit of this voltage regulator, which includes the thermistor 64, is particularly useful in motor vehicle electrical systems where the generator charges a battery. Thus, when there is a light electrical load on the generator and during high-temperature operation of the voltage regulator the output transistor, without the use of thermistor 64, can conduct as much as 200 milliamperes when it is desired that this transistor be biased substantially fully nonconductive.

This can result in the generator maintaining an output of about 3 amperes and when the vehicle load is light the total electrical load may be of this magnitude. This means that the battery is forced to accept the excess output current of the generator with the result that the terminal voltage of the battery increases. It has been found that this condition may lead to an unstable situation known as thermal runaway where the voltage regulator ceases to control the system voltage and the thermistor 64 is utilized to prevent such a condition of operation.

The reference numeral 112 designates a switch which is used to control the energization of an electrical load 114 which is shown as a resistor. The resistor 114 is intended to represent various electrical loads on a motor vehicle such as headlamps, radio and so forth. It will of course be appreciated that separate switches are required for the separate electrical loads commonly found on a motor vehicle and these loads are energized between the conductor 24 and ground whenever a load-energizing switch is closed.

As pointed out above, the resistance of thermistor 64 is approximately 25 ohms at 140° C. and approximately 15,000 ohms at −40° C. The thermistor resistance at 25° C. is preferably 750 ohms.

What is claimed is:

1. An electrical system comprising, a generator having an output winding and a field winding, a pair of direct current terminals for energizing the field of said generator, means connecting said direct current terminals with said generator whereby said generator applies a direct voltage to said terminals, a battery connected with said generator to be charged thereby, a switching type of transistor voltage regulator including a power output stage including at least one power output transistor having a base, collector and emitter, means connecting said field winding of said generator and the collector-emitter circuit of said power output transistor in series across said direct current terminals, a driver transistor switching stage including at least one driver transistor having a collector, emitter and base, a resistor, means connecting said resistor and the collector-emitter circuit of said driver transistor in series across said direct current terminals, a junction connected intermediate one end of said resistor and the collector of said driver transistor, said junction having a first potential corresponding substantially to the saturation potential of the collector-emitter circuit of said driver transistor when said driver transistor is biased conductive and having a second higher potential when said driver transistor is biased substantially nonconductive, a semiconductor device connecting said junction and the base of said power output transistor whereby the base of said power output transistor has a potential which varies in accordance with the switching of said driver stage and differs from the potential of said junction by the amount of voltage drop across said semiconductor device, voltage-sensing means coupled to said generator and to the base of said driver transistor for biasing said driver transistor conductive and nonconductive as a function of the output voltage of said generator, and a thermistor positioned to respond to the temperature of said voltage regulator having a negative temperature coefficient of resistance connected across the base and emitter of said power output transistor and in series with said semiconductor device and resistor, said thermistor having a resistance value which is low enough at high-temperature operation of said voltage regulator to maintain said output transistor biased substantially nonconductive when said driver stage is fully conductive, said thermistor increasing its resistance as the temperature of said voltage regulator decreases to increase the base drive current to said power output transistor when it is biased toward its conductive state, said voltage-sensing means located in a circuit separate from said thermistor whereby the output voltage of said generator as determined by said voltage regulator is not substantially altered by a change in resistance of said thermistor.

2. An electrical system comprising, a generator having an output winding and a field winding, a pair of direct current terminals for energizing the field of said generator, means connecting said terminals with said generator whereby said generator applies a direct voltage to said terminals, a voltage regulator including power output transistor means having a base, collector and emitter, means connecting said field winding of said generator and the collector-emitter circuit of said transistor means in series across said direct current terminals, a driver transistor switching stage comprising first and second NPN-transistors having a common collector connection and a circuit arrangement in which the emitter of one of said transistors is directly coupled to the base of the other transistor, a resistor, means connecting said resistor and the collector-emitter circuit of said second transistor in series across said direct current terminals, a junction connected intermediate one end of said resistor and the collector of said second transistor, said junction having a first potential which corresponds substantially to the saturation potential of the collector-emitter circuit of said second transistor when said first and second transistors are biased conductive and having a second higher potential when said first and second transistors are biased substantially nonconductive, a semiconductor device connecting said junction and the base of said output transistor means, the voltage applied to the base of said output transistor means being less than the voltage of said junction by the amount of voltage drop across said semiconductor device, means including voltage divider means coupled to said generator and to the base of said first transistor for biasing said first and second transistors on and off as a function of the output voltage of said generator, and a thermistor having a negative temperature coefficient of resistance positioned to respond to the temperature of said voltage regulator connected across the base and emitter of said output transistor means and in series with said semiconductor device, said thermistor and said semiconductor device ensuring a substantially nonconductive bias condition of said output transistor means when said first and second transistors are switched conductive and during high temperature conditions of operation, said thermistor having a resistance of less than 100 ohms at a temperature of 140° C., said voltage divider means located in a circuit separate from said thermistor whereby the output voltage of said generator as determined by said voltage regulator is not substantially altered by a change in resistance of said thermistor.

3. A voltage regulating system for a generator comprising, a generator having an output winding and a field winding, a pair of direct current terminals, means connecting said terminals with said generator whereby said generator applies a direct voltage to said terminals, a switching type of transistor voltage regulator for maintaining the output voltage of said generator substantially constant including an NPN power output transistor means having a base, collector and emitter, means connecting said field winding of said generator and the collector and emitter of said power output transistor means in series across said direct current terminals, a driver transistor switching stage comprised of first and second NPN-transistors, said first and second transistors having a common collector connection and said first transistor having its emitter connected directly to the base of said second transistor, a biasing circuit connected across said direct current terminals including in a series connection said resistor and the collector and emitter of said second transistor, said biasing circuit having a junction located between said resistor and said first and second transistors, the potential of said junction varying between a first low value corresponding substantially to the saturation potential of the collector-emitter circuit of said second transistor and a second higher value when said second transistor is biased respectively conductive and nonconductive, a PN-junction semiconductor diode having its anode connected to said junction and its cathode connected directly to the base of said output transistor means, a voltage divider connected with said generator for developing a voltage which is a function of the output voltage of said generator, a Zener diode connected between said voltage divider and the base of said first transistor, said Zener diode controlling the switching of said first and second transistors as a function of the output voltage of said generator, and a thermistor having a negative temperature coefficient of resistance positioned to respond to the temperature of said voltage regulator connected across the base and emitter of said output transistor means and in series with said PN-junction semiconductor diode and resistor, the resistance of said thermistor being low enough during high-temperature operation so that the combined action of said thermistor and diode is to bias said output transistor means substantially to a cutoff condition when said second transistor is biased conductive, said voltage divider located in a circuit separate from said thermistor whereby the output voltage of said generator as determined by said voltage regulator is not substantially altered by a change in resistance of said thermistor.

4. An electrical system comprising, an alternating current generator having a polyphase output winding and a field winding, a polyphase full-wave bridge rectifier having direct current power output terminals and AC input terminals connected with the phase windings of said generator, a battery connected directly across said output terminals, a plurality of auxiliary diodes connected respectively with said phase windings of said generator, said auxiliary diodes having a common junction forming a first direct current field-energizing terminal, a second direct current field-energizing terminal provided by one of the direct current output terminals of said power bridge rectifier, a transistor voltage regulator for maintaining the output voltage of said alternating current generator substantially constant, said voltage regulator including a power output transistor means having a collector, emitter and base, means connecting said field winding and the collector-emitter circuit of said output transistor means in series across said first and second field-energizing terminals, a driver transistor switching circuit including first and second transistors, means connecting the collectors of said first and second transistors together, means connecting the emitter of said first transistor directly to the base of said second transistor, a circuit connected across said first and second field-energizing terminals including in a series connection a resistor and the collector-emitter path of said second transistor, said circuit including a junction the voltage of which varies between a first low value and a second higher value when said second transistor is biased respectively either fully conductive or nonconductive, a PN junction semiconductor diode connected between said junction and the base of said output transistor, a thermistor having a negative temperature coefficient of resistance positioned to sense the temperature of said voltage regulator connected across the base and emitter of said output transistor means and in series with said PN-junction semiconductor diode, a voltage divider connected across the direct current output terminals of said power bridge rectifier and a Zener diode connected between said voltage divider and the base of said first transistor.

* * * * *